US008562859B2

(12) United States Patent
Kato et al.

(10) Patent No.: US 8,562,859 B2
(45) Date of Patent: Oct. 22, 2013

(54) VOLTAGE NONLINEAR RESISTOR, LIGHTNING ARRESTER EQUIPPED WITH VOLTAGE NONLINEAR RESISTOR, AND PROCESS FOR PRODUCING VOLTAGE NONLINEAR RESISTOR

(75) Inventors: Tomoaki Kato, Tokyo (JP); Iwao Kawamata, Tokyo (JP); Yoshio Takada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 211 days.

(21) Appl. No.: 13/125,942

(22) PCT Filed: Nov. 17, 2008

(86) PCT No.: PCT/JP2008/070860
§ 371 (c)(1), (2), (4) Date: Apr. 25, 2011

(87) PCT Pub. No.: WO2010/055586
PCT Pub. Date: May 20, 2010

(65) Prior Publication Data

US 2011/0204287 A1 Aug. 25, 2011

(51) Int. Cl.
*C09K 3/00* (2006.01)

(52) U.S. Cl.
USPC .............. 252/182.33; 252/519.51; 252/521.1; 338/20; 338/21; 338/223; 505/100

(58) Field of Classification Search
USPC ............................... 338/20, 21, 223; 505/100
See application file for complete search history.

(56) References Cited

U.S. PATENT DOCUMENTS

| | | | | |
|---|---|---|---|---|
| 3,760,318 | A * | 9/1973 | Masuyama et al. | 338/20 |
| 2005/0143262 | A1* | 6/2005 | Hirose et al. | 505/100 |
| 2008/0238605 | A1* | 10/2008 | Yoshida et al. | 338/21 |

FOREIGN PATENT DOCUMENTS

| | | | |
|---|---|---|---|
| CN | 1236958 | A | 12/1999 |
| EP | 0 497 566 | A2 | 8/1992 |
| EP | 0 497 566 | A3 | 8/1992 |
| EP | 0 961 300 | A2 | 12/1999 |
| EP | 0 961 300 | A3 | 12/1999 |
| JP | 10 12407 | | 1/1998 |
| JP | 11-340009 | | 12/1999 |
| JP | 2001 52907 | | 2/2001 |
| JP | 2001 326108 | | 11/2001 |
| JP | 2002-217006 | | 8/2002 |

(Continued)

OTHER PUBLICATIONS

Kim, J., et al., "Sintering of Zinc Oxide Doped with Antimony Oxide and Bismuth Oxide," Journal of American Ceramic Society, vol. 72, No. 8, pp. 1390-1395, (Aug. 1989).

(Continued)

*Primary Examiner* — Khanh Tuan Nguyen

(74) *Attorney, Agent, or Firm* — Oblon, Spivak, McClelland, Maier & Neustadt, L.L.P.

(57) ABSTRACT

A voltage nonlinear resistor is made of a sintered body that mainly includes zinc oxide grains, spinel grains including zinc and antimony as main ingredients, and a bismuth oxide phase, in which the bismuth oxide phase includes at least one of alkali metals selected from the group of potassium and sodium at a ratio in the range of 0.036 at % or higher and 0.176 at % or lower. The voltage nonlinear resistor has good voltage nonlinearity and loading service life characteristics, and can be used for a lightning arrester.

8 Claims, 3 Drawing Sheets

(56) References Cited

FOREIGN PATENT DOCUMENTS

| | | |
|---|---|---|
| JP | 2002 217006 | 8/2002 |
| JP | 2002-305104 | 10/2002 |
| JP | 2002 305104 | 10/2002 |
| JP | 2002 305105 | 10/2002 |
| JP | 2003 297612 | 10/2003 |
| JP | 2004 238257 | 8/2004 |
| JP | 2008 162820 | 7/2008 |

OTHER PUBLICATIONS

International Search Report issued Feb. 24, 2009 in PCT/JP08/070860 filed Nov. 17, 2008.

Chinese Office Action issued Mar. 29, 2012 in patent application No. 200880131984.X.

* cited by examiner

VOLTAGE NONLINEAR RESISTOR, LIGHTNING ARRESTER EQUIPPED WITH VOLTAGE NONLINEAR RESISTOR, AND PROCESS FOR PRODUCING VOLTAGE NONLINEAR RESISTOR

TECHNICAL FIELD

The present invention relates to a voltage nonlinear resistor that is suitably used for a lightning arrester, a surge absorber, or the like, and also relates to a lightning arrester loaded with the voltage nonlinear resistor and to a process for producing a voltage nonlinear resistor.

BACKGROUND ART

Conventionally, a voltage nonlinear resistor, which is used for a lightning arrester, a surge absorber, or the like, is made of a sintered body, which is produced by a process including crushing, mixing, granulating, forming, firing, and post heat treatment of a composition containing zinc oxide (ZnO) as a main ingredient, bismuth oxide that is essential for expressing voltage nonlinearity, and an additive that is effective in improving electric characteristics. This sintered body is provided with electrodes and a side surface high-resistivity layer so as to constitute the voltage nonlinear resistor.

Action of a voltage nonlinear resistor is roughly divided into a stand-by state in which no surge energy is applied and an operating state in which surge energy is applied. Currently, voltage nonlinear resistors are mainly used in gap-less structures in which voltage is always applied across both ends in the stand-by state. Therefore, it is important that current flowing in an element in the stand-by state (leakage current) does not show a tendency to increase. In order that the leakage current does not show a tendency to increase, that is, in order to secure good loading service life characteristics, heat treatment after firing is usually essential (see, for example, Patent Literature 1 and 2). This heat treatment after firing prevents the leakage current from showing a tendency to increase, and hence prevents thermal runaway due to an increase in heat value of the voltage nonlinear resistor accompanying an increase in leakage current can be prevented. However, if heat treatment is performed after firing, the voltage nonlinearity of the voltage nonlinear resistor is usually prone to large deterioration. In order to prevent this, there is also proposed a method involving performing the heat treatment in two steps (see, for example, Patent Literature 3).

As an index indicating whether the voltage nonlinearity is good or bad, a flatness ratio is used. The flatness ratio is defined to be the ratio between voltages generated across both ends of the voltage nonlinear resistor when two currents having different values are supplied to the voltage nonlinear resistor, and the values of currents used for the evaluation depend on the diameter of the voltage nonlinear resistor. For example, as the flatness ratio, there is used a ratio ($V_{10kA}/V_{2mA}$) between a voltage value ($V_{10kA}$) when 10 kA current is supplied which corresponds to large current region characteristics and a voltage value ($V_{2mA}$) when 2 mA current is supplied. Efforts are being made to develop a technology for improving the voltage nonlinearity of voltage nonlinear resistors, in other words, to reduce the flatness ratio.

The performance of voltage nonlinear resistors in the stand-by state and the operating state described above depends largely on the fine structure of the sintered body. The sintered body generally includes zinc oxide grains, spinel grains containing zinc and antimony as main ingredients, and bismuth oxide phases existing in the vicinity of grain boundary triple junctions. Other than that, as an additive, there are observed zinc silicate grains containing silicon as a main ingredient. Bismuth, which is an additive essential for expressing voltage nonlinearity, is well known to exist not only in a bismuth oxide phase but also in very little amounts in the grain boundaries between zinc oxide grains (see, for example, Non-Patent Literature 1). Efforts are being made to resolve the structure thereof and to measure the interface level of the grain boundary.

In recent years, processes for obtaining voltage nonlinear resistors having good voltage nonlinearity at low cost, by decreasing the firing temperature of the voltage nonlinear resistor to 1,000° C. or lower have been disclosed (see, for example, Patent Literature 4). It is known that an appropriate $Sb_2O_3/Bi_2O_3$ ratio must be selected in order to reduce voids in the sintered body that deteriorate the voltage nonlinearity of a voltage nonlinear resistor and the break-down threshold value (withstand energy) when large amount of energy is applied to a voltage nonlinear resistor, so that a fine sintered body can be obtained, by firing at 1,000° C. or lower (see, for example, Non-Patent Literature 2). Non-Patent Literature 2 describes that the $Sb_2O_3/Bi_2O_3$ ratio is set to 0.5 as an example, and that rapid densification occurs at a firing temperature of 900° C. Further, evaporation of bismuth oxide in the firing process is one factor generating voids. However, when the firing is performed at a relatively low temperature of 1,000° C. or lower, evaporation of bismuth oxide in the firing process can be substantially suppressed. The synergistic effect of the suppression of void generation and the densification enables the voltage nonlinearity and the withstand energy of the voltage nonlinear resistor to be improved. In other words, in a firing process at 1,000° C. or lower, the $Sb_2O_3/Bi_2O_3$ ratio is a parameter that largely affects the densification and the voltage nonlinearity of a voltage nonlinear resistor.

In this way, by firing at 1,000° C. or lower, a voltage nonlinear resistor having good voltage nonlinearity can be obtained at low cost. However, in recent years, voltage nonlinear resistors having better voltage nonlinearity and loading service life characteristics are in demand.

[Patent Literature 1] Japanese Patent Laid-Open No. 52-53295

[Patent Literature 2] Japanese Patent Laid-Open No. 50-131094

[Patent Literature 3] Japanese Patent Laid-Open No. 58-200508

[Patent Literature 4] Japanese Patent Laid-Open No. 2003-297612

[Non Patent Literature 1] Kei-Iciro Kobayashi, Journal of American Ceramic Society, "Continuous Existence of Bismuth at Grain Boundaries of Zinc Oxide Varistor without Integranular Phase", 81, [8], 2071-2076 (1998)

[Non Patent Literature 2] Jinho Kim, Toshio Kimura, and Takashi Yamaguchi, Journal of American Ceramic Society, "Sintering of Zinc Oxide Doped with Antimony Oxide and Bismuth Oxide", 72, [8], 1390-1395 (1989)

SUMMARY OF INVENTION

Technical Problem

In order to improve the loading service life characteristics in the stand-by state of a voltage nonlinear resistor obtained by firing at 1,000° C. or lower, it is necessary to perform heat treatment at approximately 500° C. after the firing process. However, although heat treatment after firing can improve the loading service life characteristics, there is a drawback in that the voltage nonlinearity substantially deteriorates. In other words, there is a problem that even if a voltage nonlinear resistor having good voltage nonlinearity is obtained, the merit is largely lost by the heat treatment after the firing necessary for improving the loading service life characteristics, and hence a voltage nonlinear resistor having good voltage nonlinearity and loading service life characteristics cannot be obtained.

Therefore, the present invention is made to solve the above-mentioned problem, and an object thereof is to provide a voltage nonlinear resistor having good voltage nonlinearity and loading service life characteristics.

Solution to Problem

Up to now, for example, as disclosed in Japanese Patent Laid-Open No. 8-138910, it was considered that if the amount of sodium or potassium in the voltage nonlinear resistor is increased, the electric characteristics would deteriorate, and attempts have been tried to decrease the amount mixed in as much as possible so as to obtain good voltage nonlinearity. However, the inventors of the present invention have studied combinations of compositions containing zinc oxide as a main ingredient, bismuth oxide, and antimony oxide, and the firing temperatures in various manners. As a result, the inventors unexpectedly found that the deterioration of the voltage nonlinearity due to the heat treatment at approximately 500° C. after firing can be remarkably suppressed by firing the composition containing zinc oxide as a main ingredient, bismuth oxide, and antimony oxide at a specific molar ratio, and containing alkali metal such as sodium at 0.013 mol % or higher and 0.026 mol % or lower, at a temperature of 900° C. or higher and 1,000° C. or lower, with the result that the present invention was completed.

That is, the present invention provides a process for producing a voltage nonlinear resistor, including: firing a composition, which contains zinc oxide as a main ingredient, bismuth oxide and antimony oxide at a molar ratio satisfying $0.3 \leq Sb_2O_3/Bi_2O_3 \leq 1$, and at least one of alkali metals selected from the group consisting of potassium and sodium at a ratio in the range of 0.013 mol % or higher and 0.026 mol % or lower, at a temperature in the range of 900° C. or higher and 1,000° C. or lower; and performing heat treatment at a temperature in the range of 400° C. or higher and 600° C. or lower after the firing.

Further, the inventors of the present invention analyzed a fine structure of the sintered body to find that the voltage nonlinear resistor that was obtained by the above-mentioned process mainly included zinc oxide grains, spinel grains containing zinc and antimony as main ingredients, and a bismuth oxide phase, in which the bismuth oxide phase contained at least one of alkali metals selected from the group consisting of potassium and sodium at a ratio in the range of 0.036 at % or higher and 0.176 at % or lower.

Advantageous Effects of the Invention

According to the present invention, it is possible to provide a voltage nonlinear resistor having good voltage nonlinearity and loading service life characteristics. In addition, by using the voltage nonlinear resistor according to the present invention, it is possible to provide an overvoltage protection device at low cost, such as a lightning arrester or a surge absorber, which has good protection characteristics and life performance, and high reliability.

DESCRIPTION OF EMBODIMENTS

Hereinafter, embodiments of the present invention are described.

Embodiment 1

Figure 1:
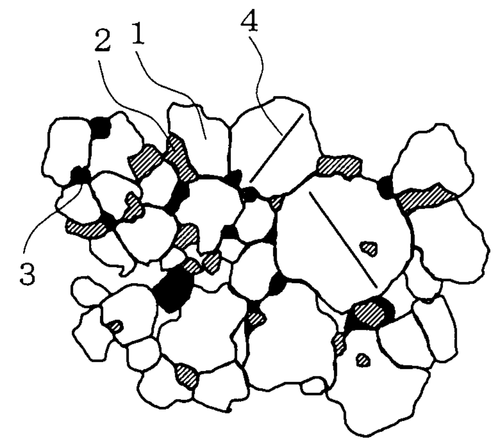
FIG. 1 is a schematic diagram illustrating a fine structure of a voltage nonlinear resistor according to Embodiment 1.

A voltage nonlinear resistor according to an embodiment of the present invention is obtained by firing a composition containing zinc oxide (ZnO) as a main ingredient, bismuth oxide and antimony oxide at a molar ratio in the range satisfying $0.3 \leq Sb_2O_3/Bi_2O_3 \leq 1$, and at least one of alkali metals selected from the group consisting of potassium and sodium at a ratio in the range of 0.013 mol % or higher and 0.026 mol % or lower at a temperature in the range of 900° C. or higher and 1,000° C. or lower, and then performing a heat treatment at a temperature in the range of 400° C. or higher and 600° C. or lower (hereinafter, referred to as post heat treatment). As illustrated in FIG. 1, the sintered body which is obtained by this process mainly comprises zinc oxide grains 1, spinel grains 2 containing zinc and antimony as main ingredients, and a bismuth oxide phase 3, and a twin boundary 4 that exists in the zinc oxide crystal grains. Further, it is found from fine structure analysis that the bismuth oxide phase contains at least one of alkali metals selected from the group consisting of potassium and sodium at a ratio in the range of 0.036 at % or higher and 0.176 at % or lower. It is considered that the alkali metal existing in the bismuth oxide phase at this constant ratio contributes largely to improvement of the loading service life characteristics and suppression of deterioration of the voltage nonlinearity due to the post heat treatment.

In this embodiment, the composition to be fired contains zinc oxide as a main ingredient, bismuth oxide, antimony oxide, and at least one of alkali metals selected from the group consisting of potassium and sodium.

The zinc oxide is contained in the composition preferably at a ratio in the range of 90 mol % or higher and 98 mol % or lower, and more preferably at a ratio in the range of 95 mol % or higher and 98 mol % or lower, from a general viewpoint of improving the voltage nonlinearity and the withstand energy, and achieving the long life. As the zinc oxide, it is usually preferred to use powder having an average grain diameter of 1 μm or smaller.

The bismuth oxide and the antimony oxide are added into the composition so as to satisfy $0.3 \leq Sb_2O_3/Bi_2O_3 \leq 1$ in the molar ratio. When the molar ratio between the bismuth oxide and the antimony oxide satisfies the above-mentioned expression, the deterioration of voltage nonlinearity due to the heat treatment after firing can be remarkably suppressed. In addition, the bismuth oxide and the antimony oxide are contained in the composition at a total ratio preferably in the range of 0.5 mol % or higher and 2 mol % or lower, and more preferably in the range of 1.0 mol % or higher and 1.5 mol % or lower, in order to further improve the voltage nonlinearity and the loading service life.

The at least one of alkali metals selected from the group consisting of potassium and sodium must be contained in the composition at a ratio in the range of 0.013 mol % or higher and 0.026 mol % or lower. If the ratio of the alkali metal is lower than 0.013 mol %, the voltage nonlinearity and the loading service life characteristics after the post heat treatment are remarkably deteriorated. If the ratio of the alkali metal is higher than 0.026 mol %, the loading service life characteristics become insufficient. It is preferred that the alkali metal normally be combined as $Na_2CO_3$ powder or $K_2CO_3$ powder having an average grain diameter of 1 μm or smaller, or as a solution containing the powder.

In order to further improve the voltage nonlinearity and the loading service life, in addition to the above-mentioned ingredients, the composition in this embodiment may contain nickel oxide, manganese dioxide, chromium oxide, cobalt oxide, silicon dioxide, and the like. The ratio of these ingredients is usually in the range of 1 mol % or higher and 2 mol % or lower in the composition. In addition, as these oxides, it is generally preferred to use powder having an average grain diameter of 1 μm or smaller.

In order to further improve the voltage nonlinearity, aluminum nitrate may be combined into the composition at a ratio in the range of 0.001 mol % or higher and 0.01 mol % or lower. In addition, in order to further improve the voltage nonlinearity and to reduce pores in the sintered body so that the withstand energy is further improved, boric acid may be combined into the composition at a ratio in the range of 0.01 mol % or higher and 0.2 mol % or lower.

Next, a process for producing the voltage nonlinear resistor according to the embodiment of the present invention is described specifically. After preparing the composition made of the above-mentioned ingredients, water, a dispersant, and a binder such as polyvinyl alcohol are added to the composition. Then, crushing and mixing are performed sufficiently so that a slurry having a homogeneous composition is produced. This slurry is dried and granulated by a spray drier so that a granular matter is obtained. The obtained granular matter is formed at a forming pressure in the range of, for example, 200 kgf/cm$^2$ or higher and 500 kgf/cm$^2$ or lower so that a compact having a predetermined shape is obtained. Next, the compact is heated in an air or oxygen atmosphere at a temperature of approximately 450° C. in order to remove the binder, and then is fired at a temperature in the range of 900° C. or higher and 1,000° C. or lower. After that, the post heat treatment is performed at a temperature in the range of 400° C. or higher and 600° C. or lower so that the sintered body is obtained. If necessary, on the sintered body, for example, electrodes may be formed by aluminum spraying or the like, or a side surface high-resistivity layer may be formed by baking glass or introducing a diffusion layer having a high resistance value.

According to the process for producing a voltage nonlinear resistor according to this embodiment, a voltage nonlinear resistor having good voltage nonlinearity and loading service life characteristics can be obtained while power consumption in the firing process can be reduced largely because the firing temperature is low in the range of 900° C. or higher and 1,000° C. or lower. In this way, the process for producing a voltage nonlinear resistor according to this embodiment is an environmentally-friendly process because $CO_2$ emissions during the process can be reduced more than in a conventional process.

Further, when a voltage nonlinear resistor obtained by this embodiment is mounted as a single unit or multilayered units on a lightning arrester, it is possible to obtain a lightning arrester having good protection characteristics and loading service life characteristics.

EXAMPLES

Hereinafter, the present invention is described specifically with reference to Examples and Comparative Examples, although the present invention is not limited thereto.

Examples 1 to 12 and Comparative Examples 1 to 11

11 kinds of compositions shown in Table 1 were each prepared by adding $Na_2CO_3$ or $K_2CO_3$ in an amount ranging from 0.003 mol % to 0.052 mol % to a basic composition containing a bismuth oxide ($Bi_2O_3$) powder, an antimony oxide ($Sb_2O_3$) powder, a nickel oxide (NiO) powder, a manganese dioxide ($MnO_2$) powder, a chromium oxide ($Cr_2O_3$) powder, a cobalt oxide ($CO_3O_4$) powder, aluminum nitrate ($Al(NO_3)_3.9H_2O$), and boric acid ($H_3BO_3$) at 0.9 mol %, 0.4 mol %, 0.5 mol %, 0.5 mol %, 0.1 mol %, 0.4 mol %, 0.004 mol %, and 0.16 mol %, respectively. The remainder is zinc oxide (ZnO). Note that, industrial raw materials or reagents were used as the raw materials. As to powder materials, powder having an average grain diameter of 1 μm or smaller was used for each of the powders.

Pure water, a dispersant, and a binder were added to each of the compositions shown in Table 1, and crushing and mixing were performed sufficiently so that a slurry having a homogeneous composition was produced.

The produced slurry was granulated by a spray drier, and the obtained granular powder was formed at a forming pressure of 500 kgf/cm$^2$, so that a disc-like compact having a diameter of approximately 40 mm and a thickness of approximately 10 mm was obtained.

The heat treatment was performed on the compact in the air at a temperature of 450° C. for 5 hours (debinder process). After that, the firing was performed at a firing temperature of 950° C., 1,000° C. or 1,050° C. for 5 hours (firing process). Temperature increasing and decreasing rates were set to 50° C. per hour. Further, the heat treatment was performed on some part of the sintered bodies (Examples 1 to 12 and Comparative Examples 1 to 10) in the air at a temperature of 500° C. for 5 hours (post heat treatment process).

Figure 2:
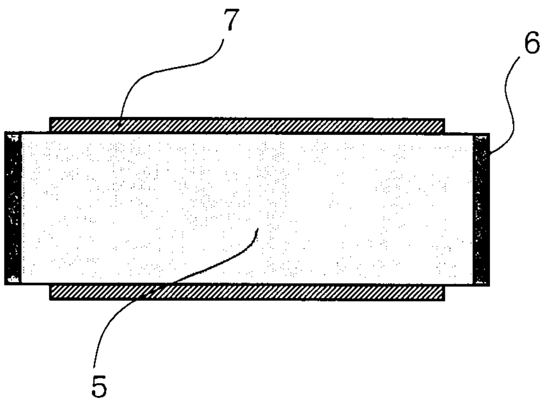
FIG. 2 is a schematic cross section of a sample for evaluation that was used in Examples and Comparative Examples.

On a side surface of the sintered body 5 obtained as described above, a side surface high-resistivity layer 6 (resin) was applied for preventing side surface flashover caused by application of an impulse voltage, and aluminum electrodes 7 were formed on both sides of the disc by aluminum spraying, so that a sample for evaluation was obtained. The schematic cross section of the sample is illustrated in FIG. 2.

Whether the voltage nonlinearity was good or bad was evaluated by the flatness ratio ($V_{2.3535kA}/V_{0.46mA}$). The value of $V_{2.35kA}$ was obtained by applying 8×20 μs impulse voltage to the sample and reading the peak value. In addition, the value of $V_{0.46mA}$ was measured using 60 Hz AC voltage (sine wave). When the AC voltage was applied, current flowing in the sample was divided into a resistance component (Ir) and a capacitance component (Ic). Ir was extracted using a resistance leakage current extractor. Specifically, the applied voltage obtained when Ir became 0.46 mA was read as the value of $V_{0.46mA}$.

As to the samples of Examples 1 to 12 and Comparative Examples 1 to 10, the flatness ratios before and after the post heat treatment were compared in order to evaluate the deterioration ratio of the flatness ratio. Note that, the deterioration ratio was calculated according to the following formula:

{(flatness ratio after post heat treatment)−(flatness ratio before post heat treatment)}/(flatness ratio before heat treatment after firing)×100(%).

In addition, as to the sample after the post heat treatment, a variation with time of Ir was measured in the condition of a temperature of 120° C. and a loading service ratio of 90%, and the loading service life characteristics were evaluated based on an increase or decrease of the variation with time of Ir. As to the determination whether or not the loading service life is acceptable, if Ir obtained when the voltage was applied did not show increasing tendency, it was determined to be acceptable.

The evaluation results of the flatness ratio, the deterioration ratio, and the loading service life characteristics are shown in Table 1.

In the case of the samples without sodium and potassium (Comparative Examples 1 and 6), it is understood that the loading service life after the post heat treatment was bad, and the deterioration ratio was large. It is understood that when the addition amount of sodium and potassium was increased to be 0.013 mol %, the loading service life became good, and further the deterioration ratio was decreased, resulting in a good flatness ratio of approximately 1.6 being obtained after the post heat treatment. However, it is understood that if the addition amount of sodium and potassium was further increased to be 0.052 mol %, the loading service life characteristics became bad. In other words, it is apparent that when at least one selected from the group consisting of potassium and sodium is added at a ratio in the range of 0.013 mol % or higher and 0.026 mol % or lower, a nonlinear resistor having good voltage nonlinearity and loading service life characteristics can be obtained.

In addition, in the case of the sample in which the firing temperature was set to 1,050° C., and the addition amount of sodium was set to 0.021 mol % (Comparative Example 11), the loading service life was good, but the flatness ratio was significantly deteriorated. This is considered to have been caused by deterioration of the voltage nonlinearity because sodium was dispersed in the zinc oxide grains so that resistance of zinc oxide grains was increased. From this result, it is desired that the firing temperature be 1,000° C. or lower. In addition, if the firing temperature is too low, the firing may not proceed so that densification of the sintered body cannot be done. Therefore, it is desired to perform the firing process at a temperature of 900° C. or higher.

Examples 13 to 15 and Comparative Examples 12 to 13

The combination ratio of bismuth oxide and antimony oxide was changed to the $Sb_2O_3/Bi_2O_3$ ratio shown in Table 2, but other than that, the same process as in Example 2 was used so that the sample for evaluation was produced. The deterioration ratio of the flatness ratio is shown in Table 2. From this result, it is apparent that the deterioration ratio can be controlled to be 2% or lower if the molar ratio of bismuth oxide and antimony oxide satisfies $0.3 \leq Sb_2O_3/Bi_2O_3 \leq 1$, but otherwise the deterioration ratio increases significantly.

TABLE 2

| | Firing temperature (° C.) | Added alkali metal | Addition amount (mol %) | $Sb_2O_3$/ $Bi_2O_3$ | Deterioration ratio (%) |
|---|---|---|---|---|---|
| Example 2 | 950 | Na | 0.021 | 0.44 | 1.3 |
| Example 13 | | | | 0.3 | 1.7 |
| Example 14 | | | | 0.5 | 1.2 |
| Example 15 | | | | 1 | 1.5 |
| Comparative Example 12 | | | | 0.2 | 6.2 |
| Comparative Example 13 | | | | 1.2 | 7.5 |

It is known that sodium and potassium are elements that usually deteriorate electric characteristics of the voltage nonlinear resistor. Therefore, there is disclosed a method involving obtaining good voltage nonlinearity by reducing the amount of sodium and potassium as much as possible (see, for example, JP 8-138910 A). However, in the currently known methods, the firing temperature is 1,100° C. or higher. Therefore, the knowledge obtained in the present invention is considered to be an effect unique to the case where the firing temperature is 1,000° C. or lower.

TABLE 1

| | Firing temperature (° C.) | Added alkali metal | Addition amount (mol %) | Flatness ratio ($V_{2.35 kA}/V_{0.46 mA}$) Before post heat treatment | After post heat treatment | Deterioration ratio (%) | Loading service life characteristics |
|---|---|---|---|---|---|---|---|
| Example 1 | 950 | Na | 0.013 | 1.57 | 1.60 | 1.9 | Good |
| Example 2 | | | 0.021 | 1.55 | 1.57 | 1.3 | Good |
| Example 3 | | | 0.026 | 1.60 | 1.60 | 0 | Good |
| Example 4 | | K | 0.013 | 1.58 | 1.64 | 3.8 | Good |
| Example 5 | | | 0.021 | 1.56 | 1.61 | 3.2 | Good |
| Example 6 | | | 0.026 | 1.55 | 1.59 | 2.6 | Good |
| Example 7 | 1,000 | Na | 0.013 | 1.58 | 1.61 | 1.9 | Good |
| Example 8 | | | 0.021 | 1.58 | 1.59 | 0.6 | Good |
| Example 9 | | | 0.026 | 1.63 | 1.63 | 0 | Good |
| Example 10 | | K | 0.013 | 1.59 | 1.65 | 3.8 | Good |
| Example 11 | | | 0.021 | 1.58 | 1.63 | 3.2 | Good |
| Example 12 | | | 0.026 | 1.60 | 1.63 | 1.9 | Good |
| Comparative Example 1 | 950 | — | 0 | 1.57 | 1.66 | 5.7 | Bad |
| Comparative Example 2 | | Na | 0.003 | 1.57 | 1.64 | 4.1 | Bad |
| Comparative Example 3 | | | 0.052 | 1.66 | 1.70 | 2.4 | Bad |
| Comparative Example 4 | | K | 0.003 | 1.59 | 1.67 | 5.0 | Bad |
| Comparative Example 5 | | | 0.052 | 1.67 | 1.75 | 4.8 | Bad |
| Comparative Example 6 | 1,000 | — | 0 | 1.57 | 1.66 | 5.7 | Bad |
| Comparative Example 7 | | Na | 0.003 | 1.57 | 1.62 | 3.2 | Bad |
| Comparative Example 8 | | | 0.052 | 1.72 | 1.73 | 0.6 | Bad |
| Comparative Example 9 | | K | 0.003 | 1.63 | 1.70 | 4.3 | Bad |
| Comparative Example 10 | | | 0.052 | 1.69 | 1.78 | 5.3 | Bad |
| Comparative Example 11 | 1,050 | Na | 0.021 | — | 1.90 | — | Good |

In addition, it is known that when lithium as the alkali metal is added to the voltage nonlinear resistor, resistance of the zinc oxide is largely increased, with the result that the nonlinear resistor becomes an almost insulating state. Similarly to sodium and potassium, experiment of adding lithium was also performed. As a result, the sample turned into an almost insulating state, and hence the electric characteristics could not be evaluated. In other words, it was confirmed that lithium had an effect of largely increasing resistance of the voltage nonlinear resistor regardless of the firing temperature. From this point of view, the effect, which is good voltage nonlinearity and loading service life characteristics which are obtained simultaneously when at least one selected from the group consisting of sodium and potassium is combined at a ratio in the range of 0.013 mol % or higher and 0.026 mol % or lower, and the firing process is performed at a temperature in the range of 900° C. or higher and 1,000° C. or lower, is considered to be a unique effect that is completely different from the conventional one.

Further, in order to clarify the effect of adding sodium and potassium, analysis on a part of the sintered body in which sodium and potassium are segregated was performed using a high performance electron probe microanalyzer (EPMA) manufactured by JEOL Ltd. The EPMA that was used for the analysis was equipped with a field emission (FE) electron gun, and with a wavelength dispersive spectroscopy (WDS) that can analyze microelements in a microregion.

The sintered body evaluated in Table 1 was cut into approximately 5 mm squares, and the surfaces thereof were polished. Then, the sintered body was etched by hydrochloric acid for approximately 10 seconds in order to clarify the grain boundary. After rinsing in pure water, a carbon film was coated by vapor deposition for preventing charge-up, and quantitative analysis of sodium and potassium amount was performed using the EPMA.

Figure 3:
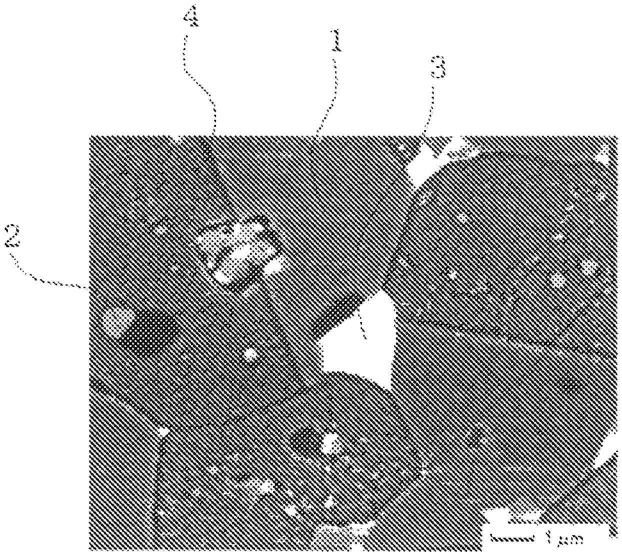
FIG. 3 illustrates an example of a reflection electron image of the voltage nonlinear resistor that was obtained in Examples.

As illustrated in FIG. 1, the sintered body has a fine structure generally including zinc oxide grains, spinel grains, and a bismuth oxide phase existing in the vicinity of the grain boundary triple junction. In particular, when the firing process is performed at a temperature of 1,000° C. or lower, evaporation of the added bismuth oxide during firing can be prevented, and hence many bismuth oxide phases exist in the vicinity of the triple junction. An example of a reflection electron image (COMPO image) of the part that was used for the actual analysis is shown in FIG. 3. The part glittering in white is the bismuth oxide phase.

Because addition of sodium and potassium largely affects whether the loading service life characteristics are good or bad, it is considered that it is the sodium and potassium contained in the bismuth oxide phase that largely influences the loading service life. Therefore, quantitative analysis of the bismuth oxide phases existing in the triple junction of the individual samples was performed in different positions (two to three positions). The results of the quantitative analysis of sodium and potassium are shown in Table 3. In the samples to which sodium or potassium was added at a ratio of 0.013 mol % or higher, sodium or potassium was detected in the bismuth oxide phase. Compared with the deterioration ratio and the loading service life characteristics shown in Table 1, it is understood that sodium or potassium was detected at a ratio in the range of 0.036 at % or higher and 0.176 at % or lower in the bismuth oxide phase of the samples in which sodium or potassium was combined at a ratio in the range of 0.013 mol % or higher and 0.026 mol % or lower (Examples 1 to 6), and the loading service life characteristics were improved while the deterioration ratio was decreased. However, as to the samples in which sodium or potassium was combined at a ratio of 0.052 mol % (Comparative Examples 3 and 5), sodium or potassium was detected at a ratio of 0.222 at % or higher in the bismuth oxide phase, and the deterioration ratio was largely increased while the loading service life became bad. From these results, it is apparent that if at least one selected from the group consisting of sodium and potassium exists at a ratio in the range of 0.036 at % or higher and 0.176 at % or lower in the bismuth oxide phase of the fine structure in the sintered body, the deterioration ratio is reduced so that the flatness ratio after the post heat treatment is decreased, and simultaneously good loading service life characteristics are obtained.

TABLE 3

| | Added alkali metal | Addition amount (mol %) | Bismuth oxide phase Na (at %) | K (at %) | Bi (at %) |
|---|---|---|---|---|---|
| Example 1 | Na | 0.013 | 0.128 | ND | 66.955 |
| | | | 0.036 | ND | 52.899 |
| Example 2 | | 0.021 | 0.112 | ND | 52.858 |
| | | | 0.176 | ND | 57.846 |
| Example 3 | | 0.026 | 0.085 | ND | 65.906 |
| | | | 0.135 | ND | 62.016 |
| Example 4 | K | 0.013 | ND | 0.098 | 60.331 |
| | | | ND | 0.107 | 54.877 |
| Example 5 | | 0.021 | ND | 0.105 | 50.401 |
| | | | ND | 0.087 | 55.222 |
| Example 6 | | 0.026 | ND | 0.145 | 63.485 |
| | | | ND | 0.059 | 64.771 |
| Comparative Example 1 | — | 0 | ND | ND | 49.530 |
| | | | ND | ND | 52.686 |
| | | | ND | ND | 48.972 |
| Comparative Example 2 | Na | 0.003 | ND | ND | 44.840 |
| | | | ND | ND | 46.469 |
| | | | ND | ND | 43.928 |
| Comparative Example 3 | | 0.052 | 0.222 | ND | 48.359 |
| | | | 0.331 | ND | 43.308 |
| Comparative Example 4 | K | 0.003 | ND | ND | 42.184 |
| | | | ND | ND | 45.111 |
| | | | ND | ND | 44.972 |
| Comparative Example 5 | | 0.052 | ND | 0.256 | 49.116 |
| | | | ND | 0.355 | 44.195 |

ND: below detection limit

The following fact is confirmed from the above description. When the voltage nonlinear resistor includes a sintered body obtained by firing the composition, which contains zinc oxide as a main ingredient, bismuth oxide and antimony oxide at a molar ratio satisfying $0.3 \leq Sb_2O_3/Bi_2O_3 \leq 1$, and at least one of alkali metals selected from the group consisting of potassium and sodium at a ratio in the range of 0.013 mol % or higher and 0.026 mol % or lower, at a temperature of 900° C. or higher and 1,000° C. or lower, at least one of alkali metals selected from the group consisting of sodium and potassium exists in the bismuth oxide phase of the sintered body at a ratio in the range of 0.036 at % or higher and 0.176 at % or lower. Therefore, the deterioration ratio after the post heat treatment is suppressed. As a result, good voltage nonlinearity and loading service life characteristics can be obtained.

The invention claimed is:

1. A process for producing a voltage nonlinear resistor, the process comprising:

firing a composition comprising zinc oxide, bismuth oxide and antimony oxide at a molar ratio satisfying $0.3 \leq Sb_2O_3/Bi_2O_3 \leq 1$, and at least one selected from the group consisting of $Na_2CO_3$ and $K_2CO_3$ at a ratio of from 0.013 mol % to 0.026 mol % based on a total amount of the composition, at a firing temperature of from 900° C. to 1,000° C.; and subsequently performing a heat treatment at a temperature of from 400° C. to 600° C.

2. The process of claim 1, wherein the composition comprises $Na_2CO_3$ at a ratio of from 0.013 mol % to 0.026 mol %.

3. The process of claim 2, wherein $Na_2CO_3$ is added to the composition as a solution comprising a $Na_2CO_3$ powder with an average grain diameter of 1 μm or smaller.

4. The process of claim 2, wherein $Na_2CO_3$ is added to the composition as a powder with an average grain diameter of 1 μm or smaller.

5. The process of claim 1, wherein the composition comprises $K_2CO_3$ at a ratio of from 0.013 mol % to 0.026 mol %.

6. The process of claim 5, wherein $K_2CO_3$ is added to the composition as a solution comprising a $K_2CO_3$ powder with an average grain diameter of 1 μm or smaller.

7. The process of claim 5, wherein $K_2CO_3$ is added to the composition as a powder with an average grain diameter of 1 μm or smaller.

8. The process of claim 1, wherein the firing temperature is from 900° C. to 950° C.

* * * * *